UNITED STATES PATENT OFFICE.

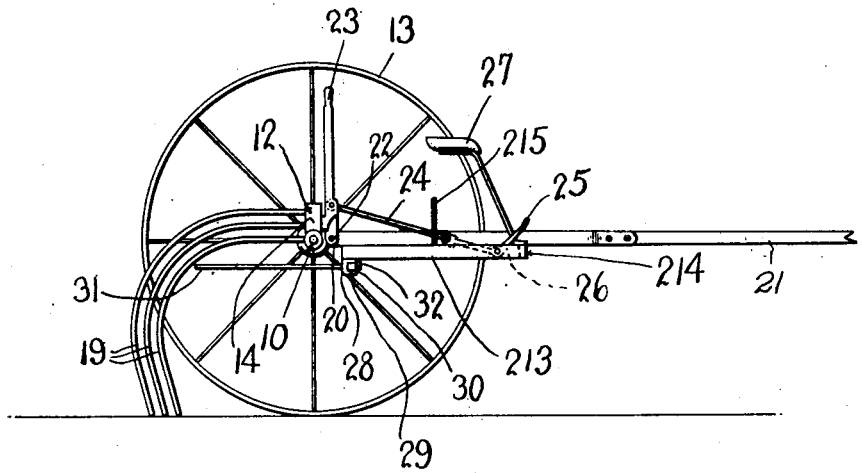
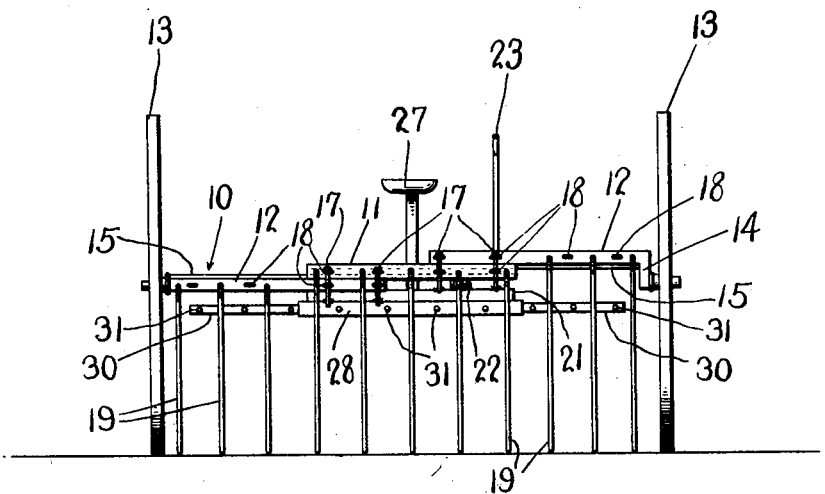

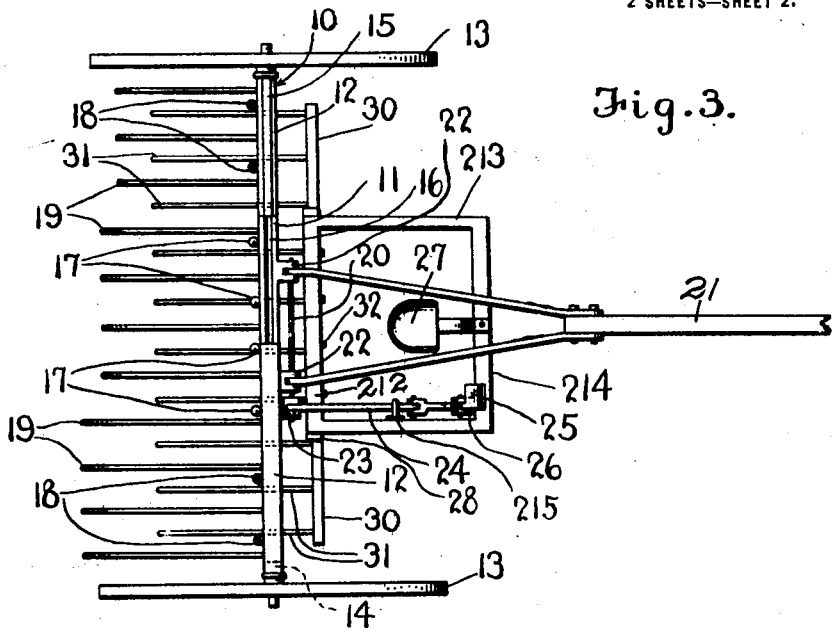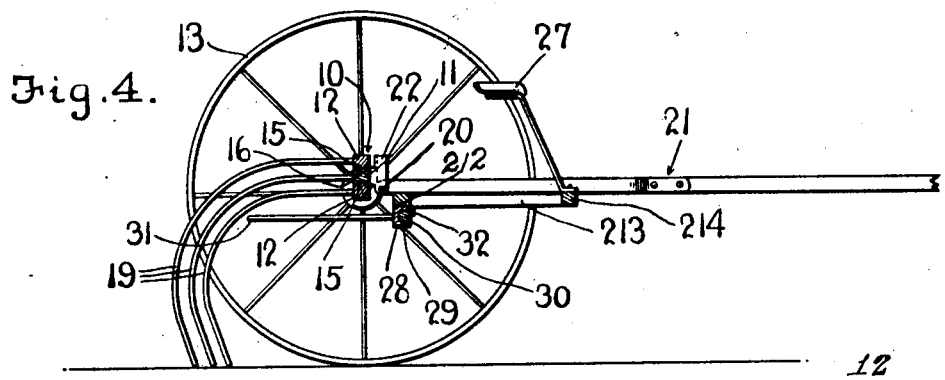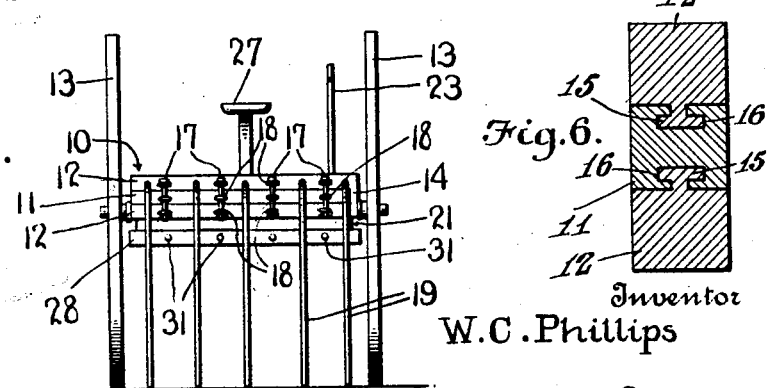

WILLIAM C. PHILLIPS, OF ROBERT LEE, TEXAS.

RAKE.

1,371,112.  Specification of Letters Patent.  Patented Mar. 8, 1921.

Application filed June 10, 1919. Serial No. 303,006.

*To all whom it may concern:*

Be it known that I, WILLIAM C. PHILLIPS, a citizen of the United States, residing at Robert Lee, in the county of Coke and State of Texas, have invented new and useful Improvements in Rakes, of which the following is a specification.

This invention relates to improvements in rakes and has for an object the provision of a rake in which the rake fingers are capable of being lifted from contact with the ground and movable independently of other rearwardly extending fingers, which are positioned between the rake fingers for the purpose of cleaning the rake.

Another object is the provision of a rake of this character which is capable of transverse adjustment, so as to regulate the width of the rake and adapt it to different requirements.

Another object is to provide a rake in which the cleaning fingers are detachably secured in sections, so as to permit of the removal of one or more sections to adapt it to the transverse adjustment of the rake.

A further object is the provision of a rake of the above description which is exceedingly simple in operation and durable of construction and which may be adapted to a wide variety of uses.

Other objects and advantages of the invention will appear as the following description is read in connection with the accompanying drawings.

In the drawings:

Figure 1 is a side elevation of a rake embodying the present invention, one of the supporting wheels being removed.

Fig. 2 is a rear elevation of the rake with the axle in extended position.

Fig. 3 is a plan view.

Fig. 4 is a central vertical longitudinal sectional view.

Fig. 5 is a rear elevation showing the axle collapsed.

Fig. 6 is an enlarged sectional view of the adjustable axle.

Referring to the drawings in detail, wherein like characters of reference denote corresponding parts, the rake axle is indicated generally at 10. This axle is formed in sections and includes a central section 11 and end sections 12. The supporting wheels, which are indicated at 13, are mounted upon the outer ends of the end sections 12, one of these sections being provided with a right angular extension 14, so that the wheel spindles will be in proper alinement.

The axle sections 11 and 12 are capable of relative longitudinal adjustment and are held together through the medium of tongues 15, preferably formed upon the sections 12, these tongues operating within grooves 16 provided in the section 11, both the tongues and grooves being substantially T shaped in cross section. In order to hold the sections in their adjusted position, there is provided a plurality of pins 17, preferably four in number, which engage eyes carried by the various sections, the pins being held within the eyes through the medium of cotter pins or other fastening devices. The eyes, which are indicated at 18, are adapted to be brought into register when the axle sections are either in their extended or collapsed position, so as to permit of the passage therethrough of the pins 17 to prevent relative sliding movement of the sections.

Secured to each of the axle sections are rearwardly and downwardly extending curved rake fingers 19, which are adapted to travel over the surface of the ground in the usual manner.

Pivotally secured to the axle section 11, upon a rod 20, is a draft tongue 21, the said tongue having bearings in brackets 22 carried by the section 11. Also mounted upon this last mentioned section is a lever 23 and pivotally secured to this lever is one end of a rod 24. The opposite end of this rod is pivotally connected to a foot lever 25, which is mounted for pivotal movement in a bracket 26 carried by the tongue 21. This foot lever is conveniently located adjacent the driver's seat 27.

Secured to the bottom of the tongue 21 is a frame which includes an outer bar 214, an inner bar 212 and parallel side bars 213. Extending from one of the bars 213, is a stop 215, which is adapted to engage and limit the upward movement of the rear end of the foot lever 25.

It will be apparent from the foregoing that the axle 10 may be pivotally moved within the hubs of the wheels 13, either by means of the hand lever 23 or the foot lever 25 and the rake fingers 19 lifted from engagement with the ground.

For the purpose of cleaning the rake fingers, there is provided a bar 28, which is secured beneath the bar 212 adjacent the axle 10 and is provided with a longitudinally extending groove 29. Removably positioned within this groove are short bar sections 30, each of which are provided with a plurality of rearwardly extending fingers 31, which extend rearwardly beneath the axle and between the rake fingers 19, so that when the axle 10 is pivotally moved, the accumulation upon the rake fingers will be wiped therefrom by contact with the fingers 31. The bar sections 30 are removably positioned within the groove 29 through the medium of T headed bolts 32, which are carried by the grooved bar 28 and are adapted to be positioned across the groove to hold the bar sections 30 in position.

It will be seen from the foregoing description and the accompanying drawings, that the invention provides a rake in which the rake fingers may be easily and quickly cleaned by tilting the axle of the rake. It is also apparent that the axle may be adjusted to regulate the width of the rake, so as to permit of its use in narrow spaces or for the purpose of traveling over narrow roads.

The invention is susceptible of various changes in its form, proportions and minor details of construction and the right is herein reserved to make such changes as properly fall within the scope of the appended claim.

Having described the invention, what is claimed is:

A rake comprising a longitudinally extensible wheel supported axle, rake fingers secured thereto, a tongue pivotally secured to the axle, a sectional bar carried by the tongue, cleaner bars extending from the bar sections between the rake fingers and means for securing the bar sections together in a manner to permit of disengagement of the sections, whereby the bar and axle may be shortened to reduce the width of the rake.

In testimony whereof I affix my signature.

WILLIAM C. PHILLIPS.